June 3, 1930.                R. S. BURDETTE                1,760,935
                        AUTOMOBILE STEERING GEAR
                        Filed Dec. 1, 1924        2 Sheets-Sheet 2
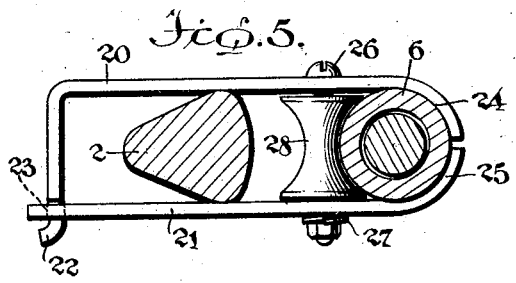
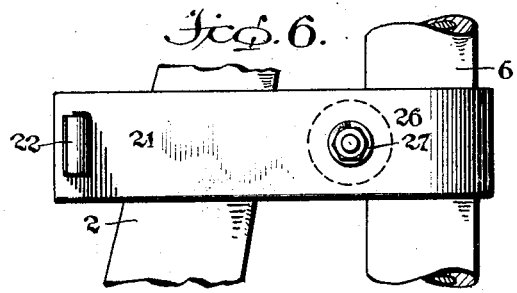
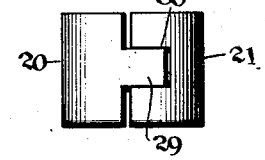
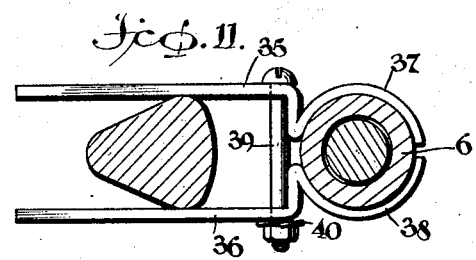
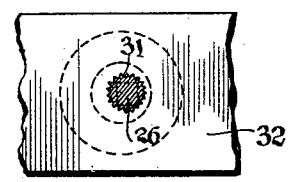
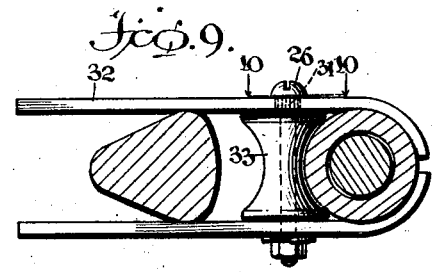
INVENTOR
Richard S. Burdette,
BY Wm C McCoy.
ATTORNEY Patented June 3, 1930

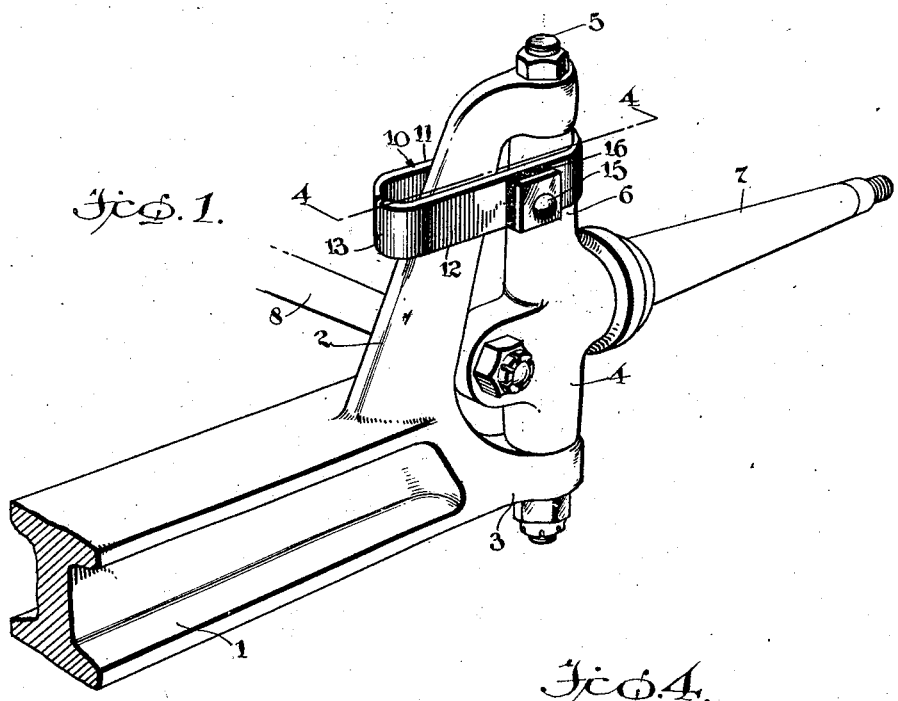

1,760,935

UNITED STATES PATENT OFFICE

RICHARD S. BURDETTE, OF AKRON, OHIO

AUTOMOBILE STEERING GEAR

Application filed December 1, 1924. Serial No. 753,149.

My invention relates to steering mechanisms, and it particularly relates to a simple and inexpensive device that is readily attachable to the steering mechanism of an automobile for preventing the development of harmonic oscillation of the front steering wheels of such vehicles.

The object of my invention is to provide a readily attachable, simple and inexpensive device that may be used with several different makes of automobiles to effectively prevent the annoying harmonic vibration of the front wheels, which is customarily called "shimmying". This term is used herein to describe the harmonic vibration of the steering wheels that is characteristic of motor vehicles having sensitive and well lubricated steering mechanisms. It is a very usual thing for vehicles, particularly of the Ford class, to develop alarming and destructive shimmying when the steering mechanism is well lubricated and adjusted for relatively easy operation.

It has heretofore been customary to so tighten the operating parts of the steering mechanism of vehicles of the Ford class as to reduce shimmying, but this is destructive of expensive bearing parts and it renders steering difficult without entirely overcoming the dangers and annoyance of shimmying front wheels.

According to my invention, I provide an inexpensive device, preferably of metal, that directly frictionally engages one or both of the front steering knuckles to thereby prevent the development of shimmying in the front steering wheels.

Figure 1 of the accompanying drawings is a perspective view showing a portion of the front axle and steering knuckle of an automobile with the proposed device applied thereto;

Figure 2 is an outer end elevational view of the front steering knuckle showing the device of Figure 1 in operating position on the steering knuckle;

Figure 3 is a fragmentary elevational view of the inner end of the device shown in Figure 1, looking from the center of the axle in the direction of the front axle;

Figure 4 is a cross-sectional view, taken substantially on the line IV—IV of Figure 1, showing a top plan view of the device in position on a steering knuckle, the parts of which are shown in cross-section.

Figure 5 is a top plan view of a modified form of my device, showing substantially the same cross-section of the steering knuckle as that shown in Figure 4;

Figure 6 is a front side elevational view of the modified form of the device shown in Figure 5;

Figure 7 is an inner end elevational view of the device shown in Figure 5;

Figure 8 is also an inner end elevational view of the device showing a modified form of interlocking of the portions of the device;

Figure 9 is a cross-sectional view of the steering knuckle showing a top plan view of an additional modification of my device;

Figure 10 is a rear side elevational view of a portion of the device shown in Figure 9, with the head of the bolt cut away;

Figure 11 is a horizontal sectional view of the steering knuckle showing an additional modification of my device in top plan view;

Figure 12 is a top plan view of a simplified form of my invention showing portions of the steering knuckle in section; and, Figure 13 is a side elevational view of the modified form of the device shown in Figure 12.

Since my device may be applied to any one of several makes of automobiles, and since I have particularly illustrated it as mounted on the front left steering knuckle of an automobile of the Ford class, I shall first describe the steering knuckle in general and shall then proceed with a detailed description of the device and its operation. It should be understood, however, that the form of steering knuckle with which the device is used is immaterial so long as it may be operatively mounted thereon.

The figures of the accompanying drawings show a portion of a front axle 1 that has a pair of arms 2 and 3 between which the steering knuckle 4 is pivotally mounted by means of a king bolt 5. The steering knuckle comprises a cylindrical sleeve portion 6 having a spindle 7 for the front steering wheel (not shown) and a steering arm 8 by means of which the front wheels of the vehicle are controlled in conventional manner.

A device 10, constructed in accordance with my invention, is mounted on the steering gear shown in the drawings: It comprises a U-shaped metal strap that encircles the arm 2 of the front axle and frictionally engages the cylindrical portion 6 of the steering knuckle 4. The U-shaped metal strap has two leg portions 11 and 12 that are connected at the base of the U by a narrow portion 13 that permits the leg portions to adjust themselves to width and taper of the portion 6 or to the surface of an irregularly formed or conical steering knuckle. Each leg portion has a friction shoe part 14 that is resiliently held against the outer surface of the steering knuckle by a through bolt 15 that has a resilient washer under one or both ends, such as a rubber washer 16 under the head of the bolt, or a spring lock washer 17 of conventional form under the nut of the bolt. Both of these washers urge the friction shoe against the steering knuckle to thereby create sufficient friction with the steering knuckle to prevent the development of the harmonic shimmying motion of the front steering wheels. Since both front wheels of the conventional automobile are so connected that one wheel cannot shimmy to any appreciable degree without the other, only one such device 10 is required on the ordinary automobile, it being usually unnecessary to impose restraining friction on more than one of the front wheels. One of these devices may, however, be mounted on each steering knuckle.

The function of my device is to prevent the development of harmonic shimmy by frictionally engaging one of the front wheels at such a point that the shimmy cannot start.

Many of the frictional anti-shimmy devices that have heretofore been proposed have been mounted on other portions of the steering mechanism more remote from the steering knuckle, with the result that there was usually enough looseness or play between the mounting of the front steering wheels and the position of the friction-imposing device to permit a slight harmonic shimmy to develop. For this reason, the partially developed shimmy developed when previously proposed devices were used was many times more difficult to check than in the device herein proposed, which engages the steering wheel directly at the steering knuckle and thereby prevents any harmonic development of a shimmy movement of the steering wheels into an harmonic shimmy. It is furthermore usually unnecessary to dampen the shimmy of more than one of the steering wheels because with one wheel so dampened the harmonic shimmy cannot build up to an objectionable degree.

The above theory of operation of the device satisfactorily explains tests of my device which show that only slight positive frictional engagement is all that is necessary, if the device is positioned as illustrated.

The device herein proposed frictionally engages the knuckle at every position with just sufficient yielding pressure imposed by either of the spring washers to prevent even the slightest degree of shimmy. In fact, the only chance for shimmy to develop at all is because of the extreme looseness of the front wheel on the steering axle. Even the harmonic shimmy motion developing from this cause is so quickly caught by my device that is does not have the opportunity to harmonically build up as in other prior proposed devices.

Figures 5, 6 and 7 illustrate a modification of my device in which two separate parts, 20 and 21, that are suitably inter-locked by a tongue 22 which extends through a slot 23 formed in the member 21, respectively, have friction portions or shoes 24 and 25 that are held in yielding engagement with the cylindrical portion 6 of the steering mechanism by a bolt 26 and a resilient washer 27. In this modification of my invention, a spool or spacing member 28 is mounted on the bolt 26, between the arms of the device, in order to protect the bolt from direct engagement with the cylindrical portion of the steering knuckle. The method of operation of this device is identical with that previously described, except that the spool insures correct seating of the friction shoes 24 and 25.

Figure 8 merely shows a modification of the tongue and groove connection that may be used in the device shown in Figures 5 and 6. The dove-tail arrangement shown in Figure 8, in which a tongue 29 registers with a slot 30, permits relative movement of the two members 20 and 21, in order that they may adjust themselves to various diameters, tapers, or irregularities of the steering knuckle portions which they frictionally engage.

Figures 9 and 10 illustrate a modification of the device shown in Figures 5, 6 and 7. The bolt 26 has a square-shaped shank and a serrated or toothed neck 31 that prevents turning of the bolt in the member 32. In this particular application of my invention, the spool 33 has an eccentric square hole that is adapted to receive the bolt by means of which the eccentric spool 33 is advanced toward the knuckle part 6. The bolt is held in adjusted position by the serrated neck 31 and the spool 33 is prevented from turning on the bolt by the square shank of the bolt. In this form of the device, it is deemed unnecessary to connect either of the members 20 and 21 at their inner end. In the devices shown in Figures 5, 6, 7, 8, 9 and 10, the spool is of less width than the distance between the arms 20 and 21, in order that the spool may not bind between the arms and hold the frictional shoes 24 and 25 out of engagement with the steering knuckle portion 6.

Figure 11 is a further simplification of my invention, embodying as it does a pair of arms 35 and 36 that have frictional seating portions 37 and 38, respectively formed at one end of each portion, and adapted to be held in contact with the portion 6 of the steering knuckle by means of a bolt 39 and a suitable resilient washer 40, as in the other devices previously described. The particular merits of this device reside in the simple construction and relatively large area of contact between the friction shoes 37 and 38 and the portion 6 of the steering knuckle.

Figures 12 and 13 show an additional and greatly simplified form of the device in which substantially flat members 40 and 41, each of which has a cylindrical seat 42 formed therein, are mutually held in yielding engagement with the opposite sides of the portion 6 of the steering knuckle 4 and the portion 2 of the front axle by means of a bolt 43, under the head of which a resilient rubber washer 44 is confined by a metal washer 45 that is interposed between the head of the bolt and the rubber washer.

The above modifications of my invention are illustrated in order to show various methods of applying the frictional retarding action directly to some portion of the steering knuckle by means of a device that includes no joints or other parts that may develop sufficient play to permit the building up of an harmonical shimmy during the operation of the vehicle.

Although I have shown only a few preferred applications of my invention, it is obviously capable of many modifications without departing from the spirit and scope of the invention. I desire, therefore, that only such limitations be imposed thereon as are set forth in the appended claims.

What I claim is:

1. A motor driven vehicle comprising a front axle, a steering knuckle pivotally supported from said axle, a pair of interlocking separable arms each having a frictional shoe at one end thereof, a bolt extending through said portions, and resilient means adapted to hold said frictional shoes in yielding contact with a portion of the steering knuckle of an automobile and with a portion of the front axle.

2. In combination with an automobile axle fork and its complementary stub axle, a friction check having two members, one on either side of, and in frictional engagement with, the upstanding arm of the fork and the stub axle body, and a bolt which carries a nut passing through the midportion of said members between the stub axle and fork and adjustable to vary the friction exerted on the stub axle by said members.

3. In combination with a front automobile axle and a spindle-carrying knuckle pivoted between upper and lower fork arms thereof; front and rear inherently rigid brake members contacting with the front and rear sides of the knuckle and with the corresponding sides of the upper fork arm of the axle, a bolt passing through said brake members between said knuckle and said upper fork arm, said bolt being slidably engaged with one of said brake members, projecting outwardly from the same and having a shoulder on its projecting portion, and a resilient compression means on said projecting bolt portion between said one brake and said shoulder, said bolt, shoulder and compression means serving to hold said brake members tightly against the front and rear sides of the upper fork arm and to also hold said brake members frictionally engaged with the front and rear sides of said knuckle to prevent idle oscillation of the latter.

4. In combination with a front automobile axle and a spindle-carrying knuckle pivoted between an upper inclined fork arm and a lower fork arm of said axle; two horizontal bars contacting with the front and rear sides of said upper fork arm and said knuckle respectively, the inner ends of said bars being turned inwardly toward each other over the upper inclined surface of said upper fork arm, the outer ends of said bars being turned inwardly toward each other over the usual wheel-carrying spindle of the knuckle, a bolt between said knuckle and said upper fork arm and passing through the central portions of said bars, and a compression spring surrounding said bolt and acting therewith to frictionally hold the two bars against said knuckle and retain said bars in engagement with said upper fork arm.

In witness whereof, I have hereunto signed my name.

RICHARD S. BURDETTE.